Figure 1:
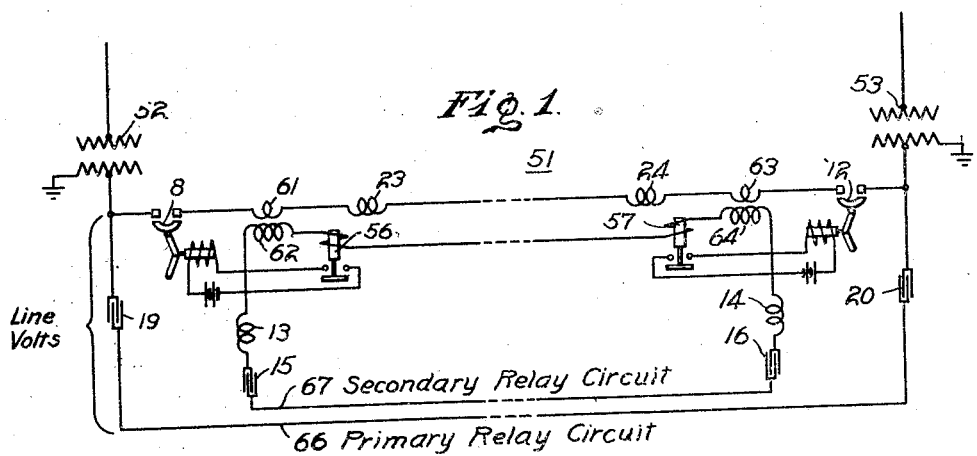

Sept. 1, 1931.  R. E. HELLMUND  1,821,342
RELAY SYSTEM FOR HIGH SPEED CIRCUIT BREAKERS
Filed Oct. 20, 1927  2 Sheets-Sheet 1

INVENTOR
Rudolf E. Hellmund
BY
ATTORNEY

Sept. 1, 1931.  R. E. HELLMUND  1,821,342
RELAY SYSTEM FOR HIGH SPEED CIRCUIT BREAKERS
Filed Oct. 20, 1927   2 Sheets-Sheet 2

INVENTOR
Rudolf E. Hellmund
BY
ATTORNEY

Patented Sept. 1, 1931

1,821,342

UNITED STATES PATENT OFFICE

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA

RELAY SYSTEM FOR HIGH-SPEED CIRCUIT BREAKERS

Application filed October 20, 1927. Serial No. 227,452.

My invention relates to protective systems and particularly to such systems operative by tuned oscillating or resonant circuits.

One object of my invention is to provide a relay system for high speed circuit interrupters.

Another object of my invention is to provide a relay system for completely isolating a faulty feeder or section in an electrical system within a relatively short time interval from the instant the fault occurs.

Another object of my invention is to provide a relay system having perfect selectivity for protecting the system from a fault occurring at or near a substation.

Another object of my invention is to provide a relay system capable of discriminating between minimum fault current and maximum load current.

Another object of my invention is to provide a relay system capable of simultaneously interrupting the circuit at each end of a faulty section.

Another object of my invention is to provide a system for obtaining selective high speed relaying of parallel trolley feeders.

Another object of my invention is to provide a system for protecting against a fault occurring in the equipment as well as in the power system.

Another object of my invention is to provide a protective system operative by means of pilot conductors associated with the main power conductors.

Another object of my invention is to provide means for isolating a faulty section comprising an arrangement of transformers normally in opposition and the use of oscillating circuits.

These and other objects that may be made apparent throughout the further description of my invention are attained by means of the apparatus hereinafter described and illustrated in the accompanying drawings.

My invention in general comprises a closed circuit called a primary relay circuit, or oscillatory circuit, containing an inductance and a capacity, and in which, when there is suddenly introduced a current or voltage of large magnitude such as may be caused by a fault, a damped oscillating current is set up in addition to whatever sustained current may be flowing as a result of a fault in the circuit. By properly choosing the inductance and capacity relation in the circuit, the frequency of the damped oscillation current may be adjusted to be different from that of the operating frequency of the circuit or system. I propose to adjust the frequency of the damped oscillating current to be very much larger than that of the operating frequency but preferably not in an even or odd harmonic thereof. The reason for this latter condition is that if an even or odd harmonic of the fundamental is chosen, it would be likely to cause sustained higher harmonic currents on account of the fact that such harmonic might be present in the operating voltage wave. The proportion should preferably be so chosen that the maximum value of the damped harmonic in the primary relay circuit is larger than the fault current of the fundamental.

The damped oscillating current set up in the primary relay circuit is transformed into a secondary relay circuit provided with an inductance and a capacity by means of which the secondary circuit may be tuned to the same frequency as, or to resonance with, the damped oscillating current in the primary circuit. The secondary relay circuit is provided with control means, actuated by the transformed oscillating currents, for operating the circuit interrupters at the ends of the faulty section and for isolating the section.

Thus, in my invention, tuned oscillations produced by a fault are utilized to isolate the fault.

Figure 2:
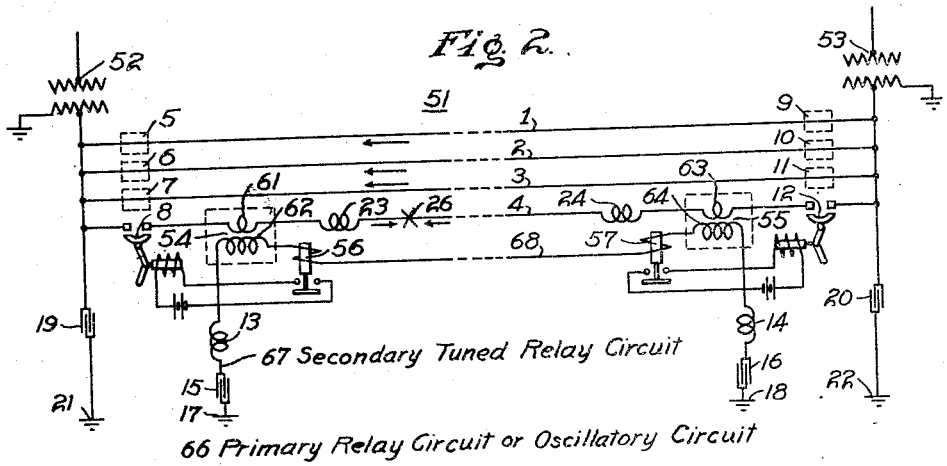
Figure 3:
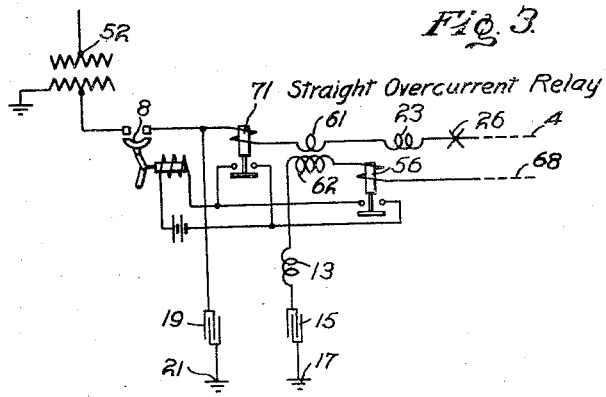
Figure 4:
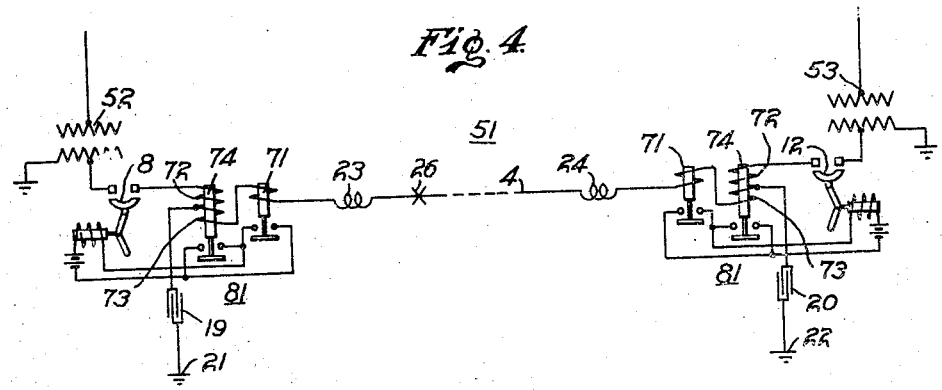

Referring to the accompanying drawings,

Figure 1 is a diagrammatic view of a system showing the elementary connections of a primary and secondary relay circuit responsive to damped oscillations, Fig. 2 is a diagrammatic view of a four trolley railway electrification illustrating the primary and secondary relay circuits responsive to damped oscillations, Fig. 3 illustrates the use of a straight overload current relay in a system having the primary and secondary relay circuits responsive to damped oscillations, and Fig. 4 illustrates a modification of my system using tuned oscillatory circuits.

Figure 5:
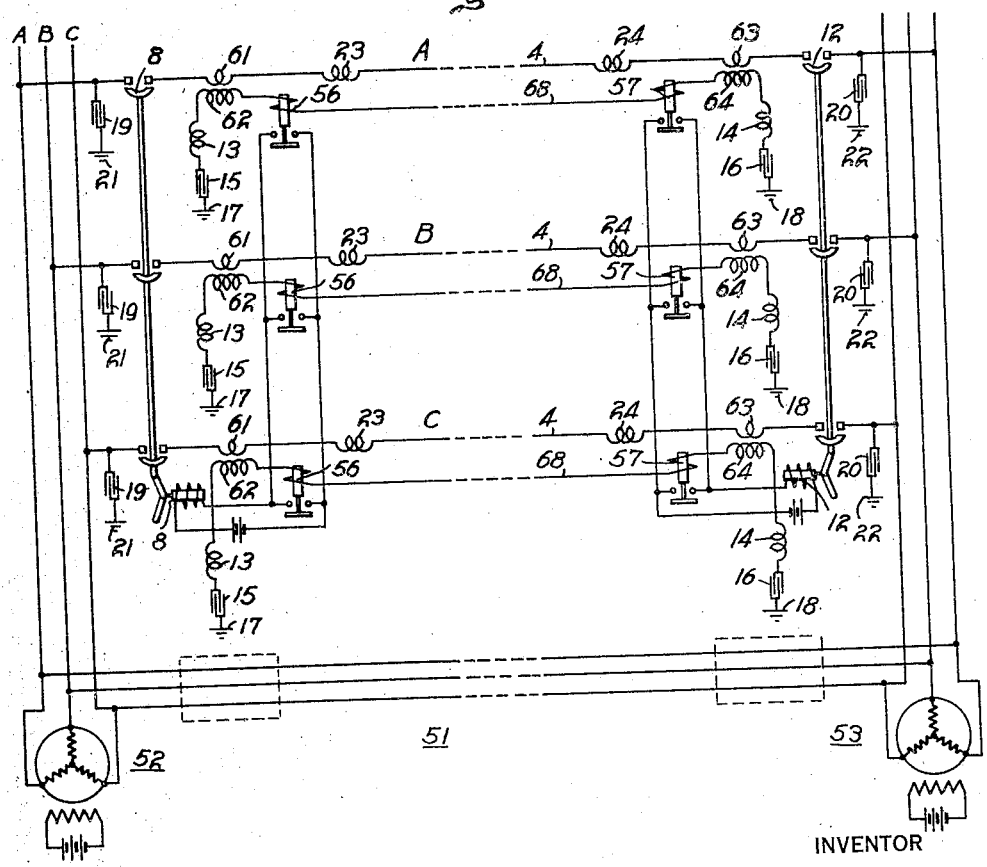

Fig. 5 illustrates the protective system applied to a three phase power system.

In practicing my invention, I provide a section of a railway electrification system 51, at one end of which is a step-down substation 52 and at the other end of which is a step-down substation 53. A four-track system with four trolley wires 1, 2, 3 and 4 is shown in Fig. 2. Between each of the step-down substations 52 and 53, there are provided four trolley conductors 1. 2, 3 and 4 of equal or approximately equal impedance, each of which is protected and isolated by two high-speed circuit interrupters 5, 6, 7, 8, 9, 10, 11 and 12, respectively, one installed at each end of each trolley conductor. A closed circuit called a primary relay circuit 66, is provided between a ground connection 21, a capacity 19, the circuit interrupter 8, a primary winding 61 of a current transformer 54, an inductance 23, the trolley feeder conductor 4, an inductance 24, a primary winding 63 of a current transformer 55, the circuit interrupter 12, a capacity means 20, and a ground connection 22.

The current transformer 54, and the inductance 23 are installed at one end of the trolley feeder conductor 4 and at the other end of the same conductor are installed the inductance 24 and the current transformer 55.

In a similar manner, the trolley feeder conductors 1, 2 and 3 are provided with separate current transformers and inductances, of like character and similarly installed. I provide also in association with the feeder conductor 4, a secondary relay circuit 67 comprising a closed circuit from a ground 17, through a capacity 15, an inductance 13, a secondary winding 62 of the current transformer 54, a relay coil 56 controlling the circuit interrupter 8, a pilot conductor 68, a relay coil 57 controlling the circuit interrupter 12, a secondary winding 64 of the current transformer 55, an inductance 14, a capacity 16, a ground connection 18 back to the ground connection 17.

Similarly associated with each of the parallel trolley feeder conductors 1, 2 and 3 there is provided a like secondary relay circuit.

Under normal operating conditions, circuit interrupters 5, 6, 7, 8, 9, 10, 11 and 12 are closed and conductors 1, 2, 3 and 4 are energized by substations 52 and 53 with energy at the normal operating frequency of the system 51.

When a fault 26 occurs, for example, in conductor 4, a flow of currents at operating frequency toward the fault 26, is suddenly set up in conductors 1, 2, 3 and 4 in directions indicated by the arrows. The current of relatively large magnitude suddenly introduced in the conductor 4, causes a sudden voltage change at inductance 23 and causes to be set up a damped oscillating current in the primary relay circuit 66 of which conductor 4 is a part, at a frequency determined by the adjusted relative values of capacities 19 and 20 and inductances 23 and 24. By means of the current transformers 54 and 55, this oscillating current is transformed into the secondary relay circuit 67 which is tuned to oscillate to the same frequency as, or to resonance with, the oscillating current of the primary relay circuit 66 by adjustment of the capacities 15 and 16 and the inductances 13 and 14. The oscillating current thus induced in the secondary relay circuit 67 will operate the relays 56 and 57 and cause the circuit interrupters 8 and 12 to operate simultaneously and isolate the faulty section or conductor 4. The sustained fault current of operating frequency flowing in the circuits can be kept within relatively small values because with the proper adjustments of the inductances and capacities, its period will be very far from tuned conditions.

The transformers 54 and 55 are so arranged by polarity connections or otherwise, and installed at the ends of conductor 4 that with such flow of fault currents between them as will be produced by the fault at 26 in the conductor 4, the voltages induced in the secondaries 62 and 64 of the transformers 54 and 55, add to each other all through the secondary relay circuit 67 and thus cause the circuit interrupters 8 and 12 to operate. Fault currents which feed through the conductors 1, 2 and 3 to the fault 26 in the conductor 4, will not however, cause isolation of the conductors 1, 2 and 3 because these currents flowing in one direction only through these conductors will induce in their respective current transformers (not shown) equal and opposite voltages and thus their corresponding secondary relay circuits (not shown) will not carry any of the damped oscillating currents. This in turn means that the circuit interrupters 5, 6, 7, 9, 10, and 11 will not be operated, as is desirable.

The relay system proposed discriminates between fault currents and load currents in a satisfactory manner, even to the extent of discriminating between minimum fault current and maximum load current when the latter exceeds the former in magnitude, as is frequently the case on a railway network wherein the short time peak loads reach very high values. In the case of load current as distinguished from fault current, the fluctuations of current are relatively gradual and no oscillations will be caused in the relay circuit at all. This at least is definitely true with loads produced by single phase commutator motor locomotives. When phase-converter or motor-generator set engines are used, the starting of the phase converter or the single phase motor may mean rather large starting currents. However, oscillations caused by them can be avoided by a proper arrangement of preventive coils on the locomotive transformer and interlocking arrangements by which the two switches at the end of the preventive coils are caused to come in or out with a small time delay between them, in order to prevent formation of surges by locomotive equipments. When a locomotive switch is opened or closed, a transient surge is established in the equipment. If a second switch is then opened or closed immediately, the source of the surge is removed before it attains any considerable magnitude.

In addition to employing the relay circuit responsive to the damped oscillations, it is, of course, possible to use a straight overload current relay 71 (Fig. 3) of the usual type, which would also operate the circuit interrupters in case of an overcurrent occurring in the conductor 4. However, these overcurrent relays such as relay 71 should be set to operate at values of current greater than those which can occur in the circuit interrupters 9, 10, 11 and 12 when a fault 26 occurs near the circuit interrupter 8. If it should happen, for instance, that an oscillation produced by a fault occurring near the circuit interrupter 8, should fail to operate the circuit interrupters 8 or 12 or both. then the circuit interrupter 8 would be operated by the overload current relay 71. The operation of the circuit interrupter 8 would cause another damped oscillation to flow in the trolley conductor 4 and transformed into the pilot wire 68, would cause the operation of the circuit interrupter 12, unless the straight overload relay corresponding to 71, located at station 53 has previously operated. The use of the straight overload current relays 71 would give additional assurance of isolating the fault. When it is used, however, it is necessary to connect the condensers 19 and 20 directly to the feeder conductor 4 as shown in Fig. 3.

An optional method of using the straight overload relay 71 and its equivalent in station 53 is to set the relay 71 so that it will trip in case of the fault shown at 26, provided relay 56 fails to function. The equivalent relay 71 in station 53 may then be depended upon to trip breaker 12. In this case, one condenser 19 may be used as before for all parallel contact lines in a given section and its equivalent condenser 20 in the station 53. The secondary relay circuit 68 is not used therefore in case of failure of either or both of relays 56 and 57.

As a modification of this system using oscillating currents and tuned circuits, the secondary relay circuit 67 comprising the pilot conductor 68 may be omitted and a system used as illustrated in Fig. 4.

In this system, there is provided a relay 81 connected in series circuit relation with and near the end of the feeder conductor 4. The relay 81 comprises two windings 72 and 73 equal and opposite and connected in series so as to oppose their effects on a movable core member 74 which controls the circuit interrupter 8, when load current is passing through them. A corresponding relay is installed at the other end of the feeder conductor 4, and arranged in a similar manner. Likewise all other feeder conductors in the system are provided with similar relays, one installed at each end of each feeder conductor.

The oscillating circuit is provided tuned by means of the inductances 23 and 24 and the capacities 19 and 20 and including in its circuit only one winding 73 of each relay 81.

Therefore the oscillations set up by a fault such as may occur at the location 26 passing through the windings 73 of the relays 81 at both ends of the conductor will cause the core members 74 to operate and operate the circuit interrupters 8 and 12 and thus isolate the conductor 4.

As applied to a three-phase power system, (Fig. 5) the operation of this protective system is the same as in the single-phase railway application. In this case, one condenser equivalent of the condenser 19 must be used for each phase. However, one condenser for each phase is sufficient for any number of parallel lines of that phase. The secondary relay circuit is not changed but other like circuits must be used with each conductor of each phase. Relays 56 and 57 actuated from the three lines of a three-phase circuit must have their contacts in parallel so that operation of any one relay will operate the three-phase circuit breaker and isolate the three-phase line. In case a short circuit to ground occurs on one of the three-phase lines, operation of the relays is identical with that obtained with the previously described single-phase system. In case of a short circuit between phases of the three-phase system, the tuning is unchanged because the ratio of the number of reactors 23 to the condensers 19 is the same. Therefore, operation of the three phase system is still the same as the single phase. The system may be applied to three-phase, whether connected in star or delta and irrespective of grounding of the neutral of the three-phase star.

In summary, my invention provides the following advantages:—

A relay system capable of acting with sufficient speed and selectivity to be effectively used to control high speed circuit breakers on any type of power system, a system for isolating a fault in a relatively short time, a system for more effectively isolating a fault occurring at or near a substation bus, a system that is capable of discriminating between a minimum fault current and a maximum load current although the latter may be of greater magnitude than the former, a system capable of simultaneously interrupting the circuit at each end of a faulty section, a system capable of selective high speed relaying of multiple conductors; of protecting against a fault occurring in the equipment as well as in the power system, of providing a relay system operative by means of a pilot wire associated with the power conductor, and a system operating in response to certain circuit conditions such as shorts and grounds other than being dependent upon load conditions as the usual overcurrent relays are.

I claim as my invention:

1. An electrical power conductor having a source of power therein and forming a portion of a primary closed oscillatory circuit responsive to oscillations set up by a fault, isolating devices therefor, means for tuning the primary oscillator circuit to a frequency different from that of the source comprising an inductance and a capacity near each end of the power conductor, transformers normally opposed near each end of the power conductor for transforming additively the oscillations into a secondary closed control circuit upon the occurrence of a fault said secondary circuit comprising a pilot conductor associated with the power conductor, a capacity and an inductance near each end of the pilot conductor for tuning to resonance with the primary circuit oscillations and means for controlling the isolating devices.

2. A conductor, a source of power therein, an oscillatory circuit coupled thereto tuned to a frequency different from that of the source by means of an inductance and capacity near each end of the conductor, isolating devices therefor controlled by means connected near each end of the conductor and having two windings normally equal and opposite arranged to oppose operation by load currents but to permit operation by oscillations set up by fault currents.

3. The combination with a protected conductor in an electric system having a power source connected thereto, of circuit-interrupters for isolating the conductor, and opening means for the interrupters including an oscillatory circuit connected directly in series circuit relation with the protected conductor, said oscillatory circuit including a condenser, and means associated with said oscillatory circuit including windings normally opposed but non-opposed upon the occurrence of a fault in the associated conductor said windings being operatively energized only by the oscillatory currents.

4. The combination with selectively protected parallel conductors in an electrical system energized by a power source, of circuit-interrupters for isolating each conductor, and opening means for the interrupters including an oscillatory circuit connected in series circuit relation with each protected conductor, and means associated with said oscillatory circuit including windings normally opposed but non-opposed only upon the occurrence of a fault in the associated conductor, said windings being operatively energized only by the oscillatory currents.

5. The combination with a protected conductor in an electric system having a power source connected thereto, of circuit-interrupters for isolating the conductor, and control means for the interrupters including means for rendering the protected conductor a portion of an oscillatory circuit, and means associated with said oscillatory circuit including windings normally opposed but non-opposed only upon the occurrence of a fault in the associated conductor, said windings being operatively energized only by the oscillatory currents.

6. The combination with selectively protected parallel conductors energized by a power source, of circuit-interrupters for selectively isolating the conductors, and opening means for the interrupters including means for rendering each protected conductor a portion of an oscillatory circuit, and means associated with said oscillatory circuits including windings normally opposed and non-opposed only upon the occurrence of a fault in the associated conductor, said windings being operatively energized only by the oscillatory currents.

7. An electric power-transmitting system comprising a source of electric power, a power conductor connected thereto and extending therefrom for transmitting electric power to a distant point or points, a tuned oscillatory circuit comprising inductance and capacitance tuned to a high frequency, and including a capacitor connected to each end of said power conductor, whereby a fault at any point between said ends sets up high-frequency oscillations in said oscillatory circuit, and means selectively responsive to said oscillations, as distinguished from the normal power currents, for disconnecting the power conductor from the source of power.

8. An electric power-transmitting system comprising a power line including a plurality of power conductors, a source of electric power connected thereto at one point, an interconnection at a distant point whereby power may be fed from an unfaulted conductor into a faulty conductor, a circuit-interrupter means at each point to interrupt the power-current flow to a fault between said points, a tuned oscillatory circuit comprising inductance and capacitance tuned to a high frequency and including a capacitor connected to one of said power conductors at each of said points, whereby a fault in said conductor between said points sets up high-frequency oscillations in said oscillatory circuit, and means selectively responsive to said oscillations, as distinguished from the normal power currents, for tripping said sectionalizing circuit-interrupter means.

9. An electric power-transmitting system comprising a source of electric power, a power conductor connected thereto and extending therefrom for transmitting electric power to a distant point or points, a pair of sectionalizing circuit-breaker means at the two ends of a line-section of said power conductor for interrupting the current-flow in the event of a fault in said line-section, said sectionalizing circuit-breaker means being spaced from each other, with a long length of power conductor therebetween and subject to line faults, a tuned oscillatory circuit comprising inductance and capacitance tuned to a high frequency, and including a capacitor connected to each end of said line-section, whereby a fault at any point between said ends sets up high-frequency oscillations in said oscillatory circuit, and means selectively responsive to said oscillations, as distinguished from the normal power currents, for tripping said sectionalizing circuit-breaker means.

10. An electric power-transmitting system comprising a source of electric power, a power conductor connected thereto and extending therefrom for transmitting electric power to a distant point or points, a tuned primary oscillatory circuit comprising inductance and capacitance tuned to a high frequency and including a capacitor connected to each end of said power conductor, whereby a fault at any point between said ends sets up high-frequency oscillations in said oscillatory circuit, a tuned secondary oscillatory circuit coupled to said tuned primary oscillatory circuit, said tuned secondary oscillatory circuit comprising inductance and capacitance tuned to substantially the same frequency as said primary oscillatory circuit, and also including a pilot wire between the two ends of said power conductor, and means responsive to the high-frequency currents in said secondary oscillatory circuit for disconnecting the power conductor from the source of power.

11. An electric power-transmitting system comprising a source of electric power, a power conductor connected thereto and extending therefrom for transmitting electric power to a distant point or points, a tuned primary oscillatory circuit comprising inductance and capacitance tuned to a high frequency and including a capacitor connected to each end of said power conductor, whereby a fault at any point between said ends sets up high-frequency oscillations in said oscillatory circuit, a tuned secondary oscillatory circuit coupled to said tuned primary oscillatory circuit, said tuned secondary oscillatory circuit comprising inductance and capacitance tuned to substantially the same frequency as said primary oscillatory circuit, and means responsive to the high-frequency currents in said secondary oscillatory circuit for disconnecting the power conductor from the source of power.

12. An electric power-transmitting system comprising a source of electric power, a power conductor connected thereto and extending therefrom for transmitting electric power to a distant point or points, a pair of sectionalizing circuit-breaker means at the two ends of a line-section of said power conductor for interrupting the current-flow in the event of a fault in said line-section, said sectionalizing circuit-breaker means being spaced from each other, with a long length of power conductor therebetween and subject to line faults, a tuned primary oscillatory circuit comprising inductance and capacitance tuned to a high frequency and including a capacitor connected to each end of said line-section, whereby a fault at any point between said ends sets up high-frequency oscillations in said oscillatory circuit, a tuned secondary oscillatory circuit coupled to said tuned primary oscillatory circuit, said tuned secondary oscillatory circuit comprising inductance and capacitance tuned to substantially the same frequency as said primary oscillatory circuit, said tuned secondary circuit being also differentially coupled relative to the normal power-current flow in the power conductor, whereby it is substantially unresponsive thereto, and means responsive to the high-frequency currents in said secondary oscillatory circuit for disconnecting the power conductor from the source of power.

13. An electric power-transmitting system comprising a source of electric power, a power conductor connected thereto and extending therefrom for transmitting electric power to a distant point or points, a pair of sectionalizing circuit-breaker means at the two ends of a line-section of said power conductor for interrupting the current-flow in the event of a fault in said line-section, said sectionalizing circuit-breaker means being spaced from each other, with a long length of power conductor therebetween and subject to line faults, a tuned primary oscillatory circuit comprising inductance and capacitance tuned to a high frequency and including a capacitor connected to each end of said line-section, whereby a fault at any point between said ends sets up high-frequency oscillations in said oscillatory circuit, a tuned secondary oscillatory circuit coupled to said tuned primary oscillatory circuit, said tuned secondary oscillatory circuit comprising inductance and capacitance tuned to substantially the same frequency as said primary oscillatory circuit, and means responsive to the high-frequency currents in said secondary oscillatory circuit for simultaneously tripping said sectionalizing circuit-breaker means.

14. An electric power-transmitting system comprising a power line including a plurality of power conductors, a source of electric power connected thereto at one point, an interconnection at a distant point whereby power may be fed from an unfaulted conductor into a faulty conductor, a circuit-interrupter means at each point to interrupt the power-current flow to a fault between said points, a tuned primary oscillatory circuit comprising inductance and capacitance tuned to a high frequency and including a capacitor connected to one of said power conductors at each of said points, whereby a fault in said conductor between said points sets up high-frequency oscillations in said oscillatory circuit, a tuned secondary oscillatory-circuit means coupled to said tuned primary oscillatory circuit, said tuned secondary oscillatory circuit comprising inductance and capacitance tuned to substantially the same frequency as said primary oscillatory circuit, and means responsive to the high-frequency oscillatory currents in said tuned secondary oscillatory-circuit means for causing the operation of the circuit-interrupter means at both ends of a faulty power conductor substantially simultaneously.

In testimony whereof, I have hereunto subscribed my name this 8th day of October, 1927.

RUDOLF E. HELLMUND.